(12) United States Patent
Coulter et al.

(10) Patent No.: US 7,739,464 B1
(45) Date of Patent: Jun. 15, 2010

(54) CONSISTENT BACKUPS OF DATA USING A ROLL-BACK LOG

(75) Inventors: Timothy R. Coulter, Morgan Hill, CA (US); Raghu Krishnamurthy, Santa Clara, CA (US); Par A. Botes, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 425 days.

(21) Appl. No.: 10/881,723

(22) Filed: Jun. 30, 2004

(51) Int. Cl.
G06F 12/00 (2006.01)
G06F 13/00 (2006.01)
G06F 13/28 (2006.01)

(52) U.S. Cl. ........................................ 711/162
(58) Field of Classification Search .................. 711/162
See application file for complete search history.

(56) References Cited

U.S. PATENT DOCUMENTS

| | | | | |
|---|---|---|---|---|
| 5,485,598 A * | 1/1996 | Kashima et al. | ............... | 714/6 |
| 5,487,160 A * | 1/1996 | Bemis | ........................ | 711/114 |
| 5,535,381 A * | 7/1996 | Kopper | ........................ | 710/52 |
| 5,835,953 A * | 11/1998 | Ohran | ........................ | 711/162 |
| 6,158,019 A | 12/2000 | Squibb | ........................ | 714/13 |
| 6,161,219 A | 12/2000 | Ramkumar et al. | ......... | 717/130 |
| 6,691,245 B1 * | 2/2004 | DeKoning | .................... | 714/6 |
| 6,732,293 B1 | 5/2004 | Schneider | .................... | 714/15 |
| 6,839,819 B2 | 1/2005 | Martin | ........................ | 711/162 |
| 6,898,688 B2 * | 5/2005 | Martin et al. | ................. | 711/202 |
| 6,911,983 B2 | 6/2005 | Sabella et al. | ................. | 345/536 |
| 6,983,352 B2 | 1/2006 | Keohane et al. | ............. | 711/162 |
| 7,085,900 B2 * | 8/2006 | Inagaki et al. | ................ | 711/162 |
| 7,257,606 B2 | 8/2007 | Kapoor et al. | ............... | 707/205 |
| 2002/0112134 A1 | 8/2002 | Ohran et al. | ................. | 711/162 |
| 2002/0129047 A1 | 9/2002 | Cane et al. | .................. | 707/204 |
| 2003/0005235 A1 | 1/2003 | Young | ......................... | 711/141 |
| 2003/0115431 A1 * | 6/2003 | Hubbard et al. | ............. | 711/162 |

(Continued)

FOREIGN PATENT DOCUMENTS

WO    WO 02/059749 A1    8/2002

OTHER PUBLICATIONS

Tanenbaum, Andrew, "Structured Computer Organization," Prentice Hall, 1984, pp. 10-12.

*Primary Examiner*—Sheng-Jen Tsai
(74) *Attorney, Agent, or Firm*—Campbell Stephenson LLP

(57) ABSTRACT

A system or method for creating a point-in-time (PIT) or backup copy of one or more data volumes using a roll-back log. The backup copy can be created without employing hot backup mode. In one embodiment, the method includes copying data blocks of a volume to a backup memory configured to store a backup copy of the volume, wherein the data blocks are sequentially copied until all of the data blocks of the volume are copied to the backup memory. A first request is generated to overwrite existing data of a first data block of the volume with new data before all of the data blocks of the volume are copied to the backup memory. Before overwriting the existing data and before all of the data blocks of the volume are copied to the backup memory, the existing data is copied to a first memory (e.g., the roll-back log). Before all of the data blocks of the volume are copied to the backup memory, the existing data is overwritten with the new data.

13 Claims, 6 Drawing Sheets

U.S. PATENT DOCUMENTS

| | | |
|---|---|---|
| 2003/0140070 A1 | 7/2003 | Kaczmarski et al. ........ 707/204 |
| 2004/0034752 A1 | 2/2004 | Ohran ....................... 711/161 |
| 2004/0073831 A1 | 4/2004 | Yanai et al. ..................... 714/7 |
| 2005/0027956 A1* | 2/2005 | Tormasov et al. ........... 711/162 |
| 2005/0076262 A1* | 4/2005 | Rowan et al. .................. 714/6 |
| 2005/0076264 A1* | 4/2005 | Rowan et al. .................. 714/6 |
| 2006/0174074 A1 | 8/2006 | Banikazemi et al. ........ 711/162 |
| 2007/0250663 A1 | 10/2007 | Welsh et al. ................ 711/117 |

* cited by examiner

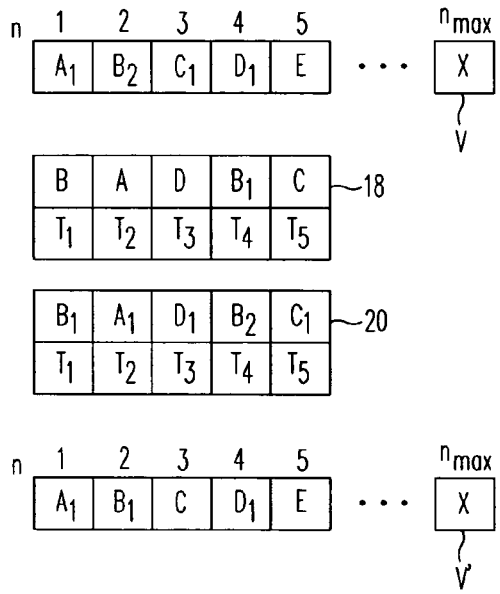
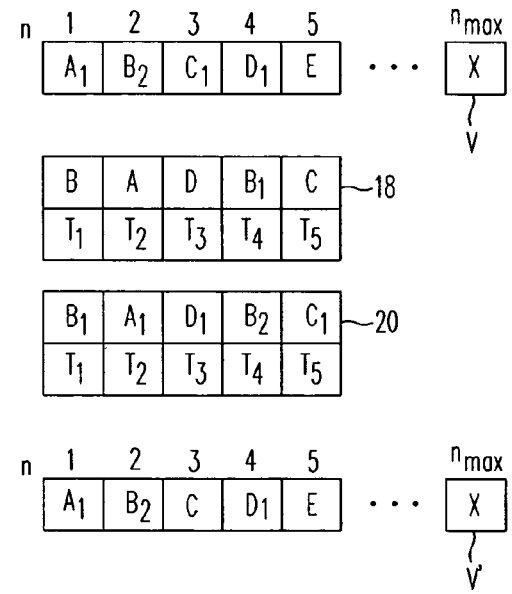
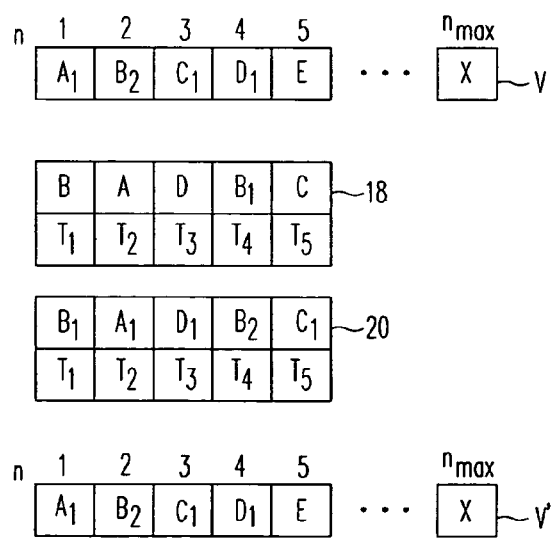
FIG. 9a   FIG. 9b
FIG. 9c

CONSISTENT BACKUPS OF DATA USING A ROLL-BACK LOG

BACKGROUND OF THE INVENTION

Businesses or other entities store their operational data (e.g., customer lists, financial transactions, business documents, business transactions, etc.) in logical volumes on memory devices such as hard disks. Unfortunately, the operational data is susceptible to corrupting events such as hardware failure, software failure, or user error. Hardware failures can range from the failure of a single hard disk to the destruction of an entire data center containing the hard disk, making some or all of the business's operational data unrecoverable. Software failures are procedural errors in an application that corrupt operational data. User errors include errors such as inadvertent deletion or overwriting of operational data that is later required. Failures and user errors often result in the loss or corruption of important operational data. The loss or corruption of operational data is particularly devastating to a business that relies heavily on electronic commerce.

Recognizing the importance of maintaining reliable operational data, businesses or other entities typically employ backup systems to protect critical operational data against corruption. Backup systems create backup or point-in-time (PIT) copies of operational data. A backup copy captures an image of the operational data at an instant in time so that if need be, everything that has happened to the operational data since that instant can be forgotten, and the state of operations (as reflected in the operational data) can be restored to that instant. Relatively simple backup programs can be used that interface with computer operating systems to backup data (e.g., files and directories stored on a hard disk) to magnetic tapes and to restore such data from the tapes onto the hard disk. Backup programs can run on standalone computer systems or on a server within a network of computer systems.

While it is a simple and fairly quick procedure to create a backup copy of an individual data object (image file, text file, etc.) the creation of a backup copy becomes more difficult as the amount of operational data increases. One method of creating a backup copy of a large volume of operational data is to copy the data from the hard disks that store the volume to one or more magnetic tapes. Once the backup has completed, the magnetic tapes are stored either locally or remotely. When a data corruption is detected in the operational data volume as a result of hardware failure, software failure, or user error, the volume is restored to its pre-corrupted data state using the backup copy.

Backup operations create backup copies that may be either full or incremental. A full backup copy means that all files in the data volume are copied regardless of how recently the files have been modified or whether a previous backup copy exists. An incremental backup means that only files of the volume that have changed since some previous event (e.g., a prior full backup or prior incremental backup) are copied. The backup window (the time needed to create the backup copy) for a full backup operation tends to be much larger when compared to the backup window for an incremental backup operation. For most applications, incremental backups are preferable at backup times since, in most cases, the number of files of the data volume that change between backups is very small compared to the number of files in the entire data volume and since the backup window is small. If backups are done daily or even more frequently, it is not uncommon for less than 1% of files of a volume to change between backups. An incremental backup in this case copies 1% of the data that a full backup would copy and uses 1% of the input/output (IO) resources between the hard disks and the backup magnetic tapes.

Incremental backup appears to be the preferred mode of protecting data. And so it is, until a full restore of all the files of the data volume is needed. A full restore from incremental backups requires starting with a restore using the newest full backup copy, followed by restores of all newer incremental backups. That can require a lot of magnetic tape handling performed by, for example, an automated robotic handler.

Restore from full backups is genuinely simpler and more reliable than restores from combinations of full and incremental backups. When recovering from individual user errors, the situation is just the opposite. Users tend to work with one small set of files for a period of days or weeks and then work with a different set. Accordingly, there is a high probability that a file erroneously corrupted by a user will have been used recently and therefore will be copied in one of the incremental backups. Since incremental backups contain a smaller fraction of data when compared to a full backup, the incremental backups can usually be searched much faster for the target file if a restore is required. From the individual user's standpoint, it is preferable to create many small incremental backups.

While backup is useful, it presents a number of disadvantages. The applications or database management systems that access volumes are required to be in "hot backup mode" before a backup operation starts on a data volume to ensure that the resulting back up copy is consistent with the data volume. Hot backup mode can impact the performance of applications or database management systems. For example, applications or database management systems cannot write new data to the volume until the backup operation has completed since the data contents of the volumes must remain unchanged during the backup window. Otherwise the resulting backup copy will not be consistent to a single point in time. A data storage log can be employed to store new volume data until the backup operation completes, and the volumes can be overwritten with the data stored in the storage log when the backup operation completes. However, these storage logs are complicated. Another problem is that applications often require that the application's backup method be used for backups. This limits the ability of an independent backup product to provide backup services without coordination with the application.

SUMMARY OF THE INVENTION

A system or method for creating a point-in-time (PIT) or backup copy of one or more data volumes using a roll-back log. The backup copy can be created without employing hot backup mode. In one embodiment, the method includes copying data blocks of a volume to a backup memory configured to store a backup copy of the volume, wherein the data blocks are sequentially copied until all of the data blocks of the volume are copied to the backup memory. A first request is generated to overwrite existing data of a first data block of the volume with new data before all of the data blocks of the volume are copied to the backup memory. Before overwriting the existing data and before all of the data blocks of the volume are copied to the backup memory, the existing data is copied to a first memory (e.g., the roll-back log). Before all of the data blocks of the volume are copied to the backup memory, the existing data is overwritten with the new data.

BRIEF DESCRIPTION OF THE DRAWINGS

The present invention may be better understood, and its numerous objects, features, and advantages made apparent to those skilled in the art by referencing the accompanying drawings.

FIGS. 3a and 3b illustrate the data state of a data volume V, the roll-back log, and roll-forward log after performing the process steps shown in FIG. 2;

FIGS. 5a-5c illustrate the data state of a data volume V, the roll-back log, roll-forward log, and the backup copy V' after performing the process steps shown in FIGS. 2 and 4;

FIGS. 9a-9c illustrates the data state of the backup copy V' after repeatedly performing the process shown in FIG. 8.

The use of the same reference symbols in different drawings indicates similar or identical items.

DETAILED DESCRIPTION

The present invention relates to a system or method for creating a point-in-time (PIT) or backup copy of one or more data volumes. Although the present invention will be described with reference to creating a backup copy on the volume level, the present invention may find application to creating a backup copy on the file system or database level. In one embodiment, the present invention allows the creation of backup copies without employing hot backup mode. For purposes of explanation, the present invention will be described with reference to creating a backup copy of one data volume V, it being understood that the present invention should not be limited thereto. Indeed, the present invention can be used to create a backup copy of several data volumes without the need of employing hot backup mode.

Figure 1:
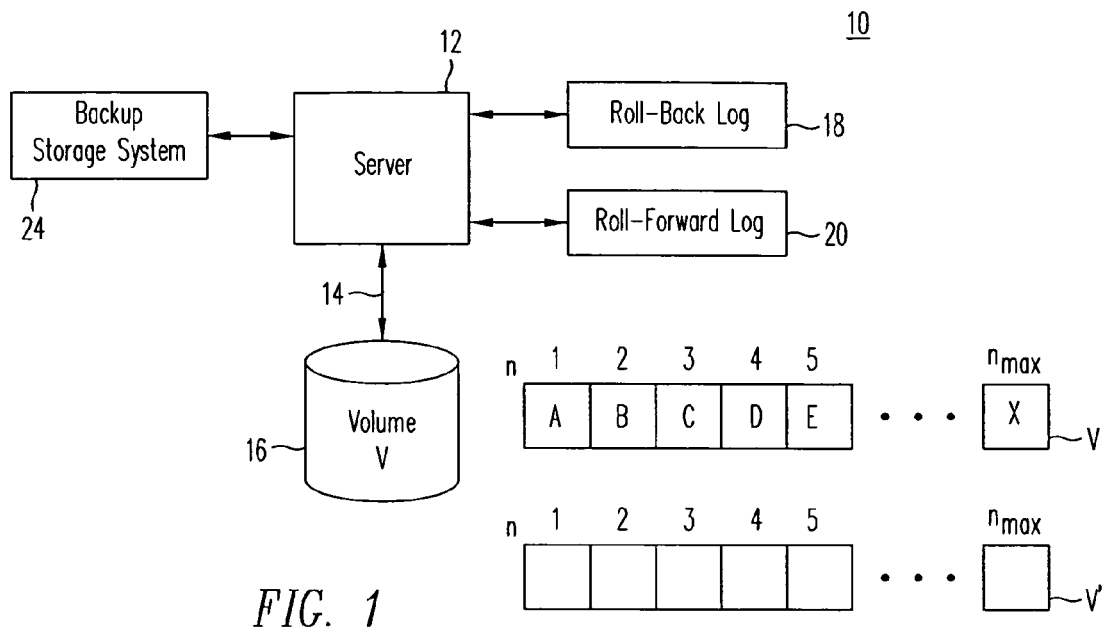
FIG. 1 shows a block diagram of relevant components in a data processing system employing one embodiment of the present invention.

FIG. 1 illustrates relevant components of a data processing system 10 employing one embodiment of the present invention. It should be noted that the present invention can be employed in data processing systems other than that shown in FIG. 1. System 10 in FIG. 1 includes a computer system 12 coupled directly or indirectly to a memory system 16 that stores data volume V. Computer system 12 can be any computer or other data processing device. For example, computer system 12 can be a conventional personal computer, a server, a special purpose computer, or the like. For purposes of explanation, computer system 12 is presumed to take form in a server having one or more processors for executing instructions.

Server 12 generates transactions to directly or indirectly read data from or write data to volume V in response to executing an application program (not shown). A write data transaction is completed by overwriting existing data $D_{old}$ in one or more data blocks of volume V with new data $D_{new}$. For ease of explanation only, it will be presumed that each write transaction, when completed, overwrites all existing data $D_{old}$ in a single block of volume V with new data $D_{new}$, it being understood that the present invention should not be limited thereto. When a write transaction completes, there may be very little difference between existing data $D_{old}$ and new data $D_{new}$.

Transaction requests to read or write data are transmitted directly or indirectly to memory system 16. Server 12 communicates directly or indirectly with memory system 16 via communication link 14. Communication link 14 may take form in a storage area network (SAN) having one or more components such as switches, hubs, routers (not shown), etc. System 10 may also include additional components (e.g., a database management system, a file system, a volume manager, etc.) in data communication with each other and with the application executing on server 12 and volume V, even though the additional components are not shown within FIG. 1.

Memory 16 may take form in one or more disk arrays or other storage devices, it being understood that the term memory system should not be limited thereto. For purposes of explanation, it will be presumed that memory system 16 takes form in a single disk array that stores logical data volume V. FIG. 1 illustrates a graphical representation of volume V. Volume V is an abstraction consisting of $n_{max}$ data blocks that store or are configured to store data. While it is said that the data blocks of volume V store data, in reality, data is stored within respective physical memory blocks within disk array 16. The first five data blocks designated 1-5 of volume V in FIG. 1 are shown storing data designated A-E, respectively, at an initial time $t_0$. The last block $n_{max}$ is shown storing data designated X.

FIG. 1 shows a backup storage system 24 in data communication with server 12. For purposes of explanation, it will be presumed that backup storage system 24 takes form in a robotic tape media handler with access to one or more magnetic data storage tapes. One or more tapes within backup storage system 24 store or are configured to store data of a backup copy V' of volume V. Backup copy V' is shown consisting of $n_{max}$ data blocks that store or are configured to store a copy of data from $n_{max}$ data blocks, respectively, of volume V. While it is said that the data blocks of backup copy V' store data, in reality, data is stored within respective segments of one or more magnetic tapes. FIG. 1 shows backup copy V' before volume V data is copied thereto.

FIG. 1 also show memory devices 18 and 20 coupled to and accessible by server 12. For purposes of explanation only, each of the memory devices 18 and 20 will take form in random access memory (RAM), it being understood that the present invention should not be limited thereto. Memory devices 18 and 20 may be configured as sequential logs. Data is read from sequential logs in the order in which the data is stored therein. Thus, the last data item stored in a sequential log is the first to be read out, and the first data item stored in a sequential log is the last to be read out.

Memory device 18 is designated as roll-back log while memory device 20 is designated as roll-forward log. Roll-back log 18 stores or is configured to store existing data $D_{old}$ copied from volume V before $D_{old}$ is overwritten with new data $D_{new}$ of a corresponding write transaction. The roll-forward log 20 stores or is configured to store copies of the new data $D_{new}$. In one embodiment, the roll-forward log 20 may take form in a storage replication log (SRL). SRLs are typically used in systems for replicating data volumes.

Before or after existing data $D_{old}$ is copied to roll-back log 18, in one embodiment, existing data $D_{old}$ may be compressed according to any one of many well-known compression algorithms. Such compression would reduce the amount of storage space within roll-back log 18 needed to store data. Likewise, before or after new data $D_{new}$ is copied to roll-forward log 20, new data $D_{new}$ may also be compressed. For purposes of explanation, it would be presumed that data is stored in logs 18 and 20 in compressed format. Thus, before data can be read out and used from logs 18 and 20, the data must be decompressed.

Figure 2:
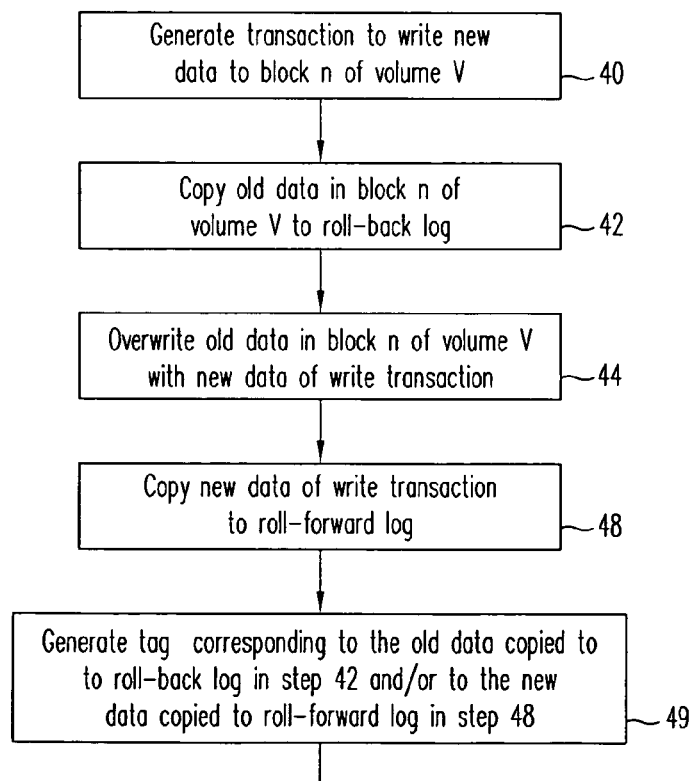
FIG. 2 illustrates relevant aspects of writing data to roll-back and roll-forward logs of FIG. 1 in accordance with one embodiment of the present invention.

Before existing data $D_{old}$ in any block of volume V is overwritten with new data $D_{new}$, the existing data $D_{old}$ is copied to roll-back log 18. New data $D_{new}$ is copied to roll-forward log 20 either before existing data $D_{old}$ is overwritten or after existing data $D_{old}$ is overwritten. FIG. 2 describes this process in greater detail. For purposes of explanation, the process shown in FIG. 2 is implemented by server 12 executing instructions stored in memory (not shown). The process in FIG. 2 starts in step 40 when the application executing on server 12 generates a transaction to overwrite existing data $D_{old}$ in block n of volume V with new data $D_{old}$. In step 42, before the existing data $D_{old}$ in block n is overwritten with the new data $D_{new}$, the old data $D_{old}$ is copied to roll-back log 18. In step 44, existing data $D_{old}$ in block n is overwritten with new data $D_{new}$. In step 48, a copy of the new data $D_{new}$ is stored in roll-forward log 20. It is noted that steps 44 and 48 may be reversed in order. Lastly, a tag Tm is generated. Tag Tm corresponds to the existing data $D_{old}$ written to log 18 in step 42 and/or the new data $D_{new}$ written to roll-forward log 20 in step 48. A new tag Tm is generated each time data is copied to logs 18 and/or 20. The tag number m is generated sequentially so that sequentially generated tags have sequential tag numbers. The application executing on server 12 may access data volume V while existing data $D_{old}$ within volume V is copied to roll-back log 18 or while new data $D_{new}$ is copied to roll-forward log 20.

Tag Tm may include a time stamp. The time stamp identifies the time when one of the steps shown within FIG. 2 completes. For example, the time stamp may be the time when the transaction is generated in step 40 by server 12. In the alternative, the time stamp may identify the time when new data $D_{new}$ is copied to the roll-forward log 20. For purposes of explanation, it will be presumed that the time stamp is the time when $D_{old}$ in block n of volume V is overwritten with new data $D_{new}$ as shown in step 42.

Tag Tm will also be described as including an identification of the data block (i.e., block n) in volume V that is the target of the corresponding write transaction. In the embodiment where more than one data volume is accessed by the application of server 12, the tag Tm may include an identification of the volume that contains a target block of the corresponding write transaction. In the embodiment where more than one data block is the target of a corresponding write data transaction, the tag Tm may include an identification of the first data block and a number of consecutive blocks following the first data block where the new data $D_{new}$ is to be written. In the embodiment where only a portion of existing data $D_{old}$ in a data block is the target of the corresponding write data transaction, the tag Tm may include an identification of the data block, an offset from the beginning of the data block, and a data length of the new data $D_{new}$.

Tag Tm may also include information (e.g., a flag set to binary 1 or 0) indicating that data has or has not been stored within roll-back log 18 and/or roll-forward log 20 in compressed format. It is noted that other information may be included within the tags. The tag Tm may be stored alongside existing data $D_{old}$ copied to log 18, alongside the new data $D_{new}$ copied to log 20, or alongside both. In the alternative, Tag Tm may be stored in a separate tag table. Each tag Tm, however, is associated with a respective block of existing data $D_{old}$ stored in roll-back log 18 and/or a respective block of new data $D_{new}$ stored in roll-forward log 20.

Figures 3A, 3B, 5A, 5B:
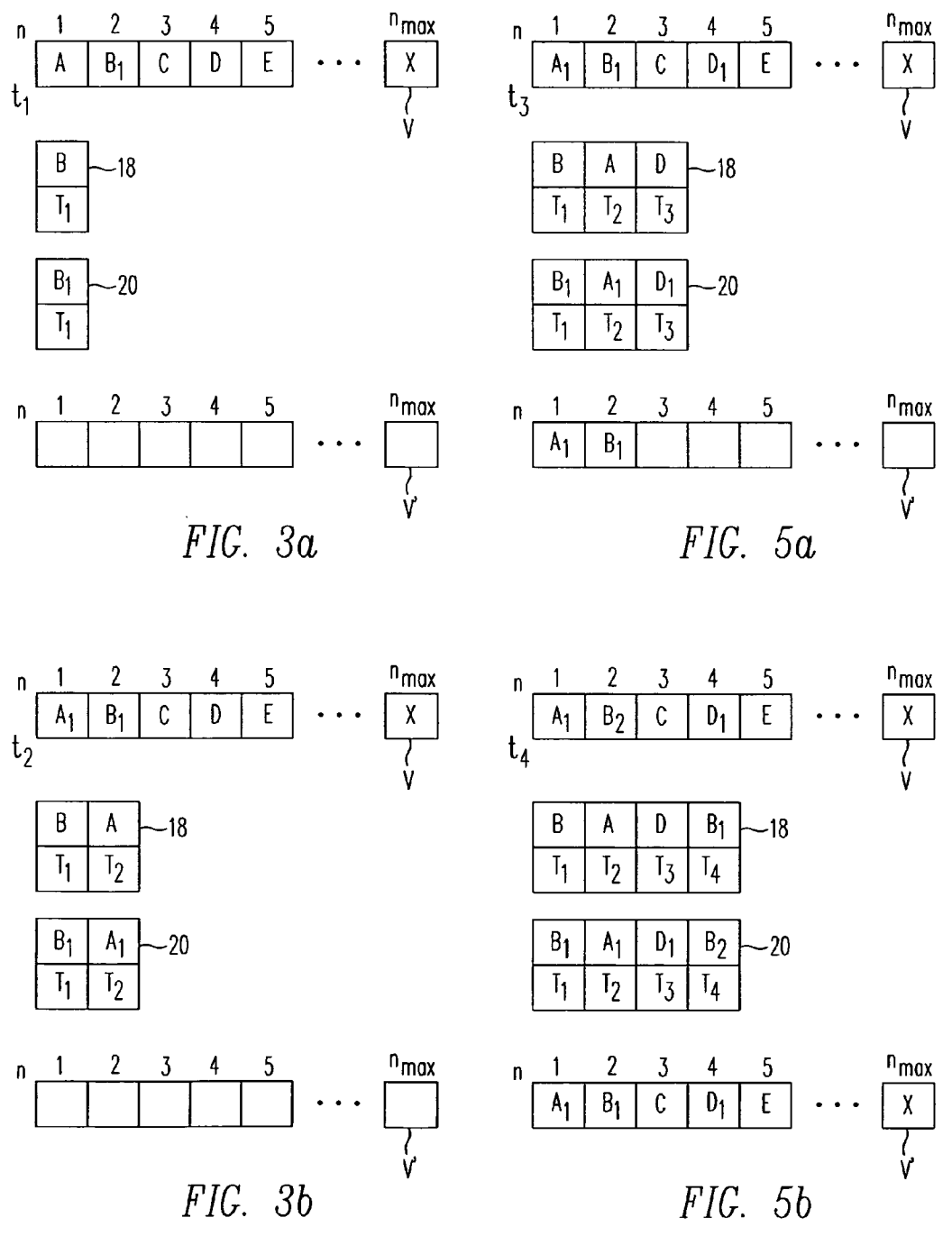

FIG. 3a illustrates changes to the data contents of Volume V, roll-back log 18, and roll-forward log 20 after completing a first write transaction in accordance with the process shown in FIG. 2. More particularly, after time $t_0$ server 12 generates the first write data transaction to overwrite existing data (designated B) in block 2 of volume V with new data (designated $B_1$). Before existing data B of block 2 is overwritten, data B is copied to roll-back log 18 in accordance with step 42 of FIG. 2. Data B is stored in log 18 in compressed format. The existing data B in block 2 of volume V is then overwritten with new data $B_1$. The new data $B_1$ is copied to roll-forward log 20 either before or after existing data B is overwritten. Data $B_1$ is stored in roll-forward log 20 in compressed format. Lastly, server 12 generates tag T1 which it stores along with new data $B_1$ in roll-forward log 20 and with existing data B in roll-back log 18. Tag T1 includes the identification of the target block (e.g., block 2) of the first write transaction. Additionally, tag T1 includes a time stamp set to time $t_1$, the time when data B was overwritten in volume V. FIG. 3a shows state of volume V, roll-back log 18, and roll-forward log 20 after completion of the first write transaction in accordance with the process steps shown in FIG. 2.

After server 12 generates the first write transaction, server 12 generates a second write transaction to overwrite existing data (designated A) in block 1 of volume V with new data (designated $A_1$). Before existing data A of block 1 is overwritten, data A is copied to roll-back log 18. The existing data A in block 1 of volume V is then overwritten with the new data $A_1$ of the second write transaction. The new data $A_1$ is copied to roll-forward log 20 either before or after existing data A is overwritten. New data $A_1$ and existing data A are stored in compressed formats in logs 20 and 18, respectively. Lastly, server 12 generates a tag T2 which is stored along with new data $A_1$ in roll-forward log 20 and along with existing data A in roll-back log 18. Tag T2 includes the identification of the target block (e.g., block 1) of the second write transaction. Additionally, tag T2 includes a time stamp set to time $t_2$, the time when data A is overwritten in volume V. FIG. 3b shows the state of volume V at time $t_2$, and the state of roll-back log 18, and roll-forward log 20 after completion of the second write transaction in accordance with the process steps shown in FIG. 2.

Server 12 includes instructions stored in memory for creating a backup copy of volume V. It is noted that the backup process can be performed on a device external to server 12 in another embodiment. However, for purposes of explanation, it will be presumed that server 12 performs the backup operation. It will be presumed that the backup operation is scheduled to occur at time $t_{start}$, a time just after time $t_2$, the time when data A in block 1 of volume B is overwritten with the new data $A_1$ of the second write transaction.

Figure 4:
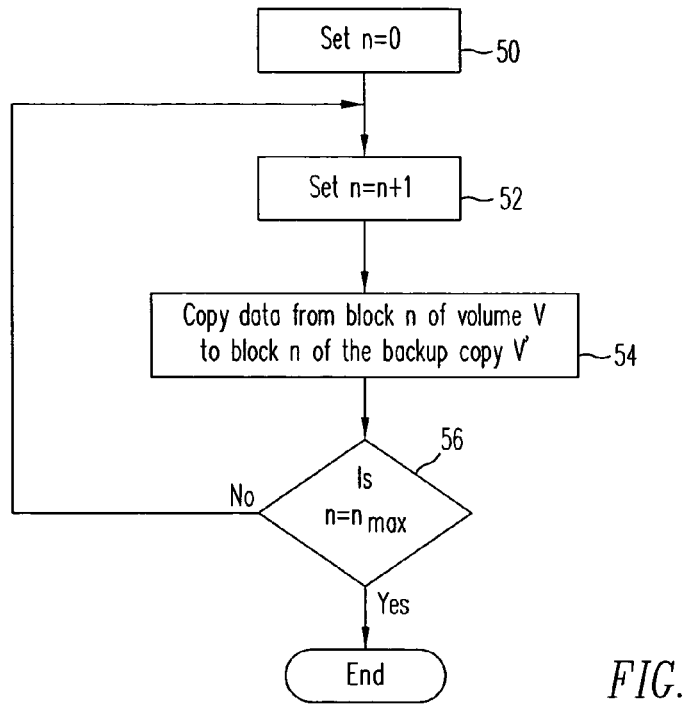
FIG. 4 illustrates operational aspects used in creating a backup copy of volume V.

FIG. 4 illustrates operational aspects performed by server 12 to create the backup copy V' of volume V. More particularly, in step 50 server 12 sets a dummy variable n to 0. Thereafter in step 52, server increments n by 1. In step 54, server 12 copies the data contents of block n of volume V to block n of backup copy V'. In step 56, server 12 compares the current value of n with $n_{max}$, the number of the last data block in volume V. Steps 52 and 54 are repeated until n equals $n_{max}$. When n equals $n_{max}$ in step 56, the process ends.

Figure 5C:
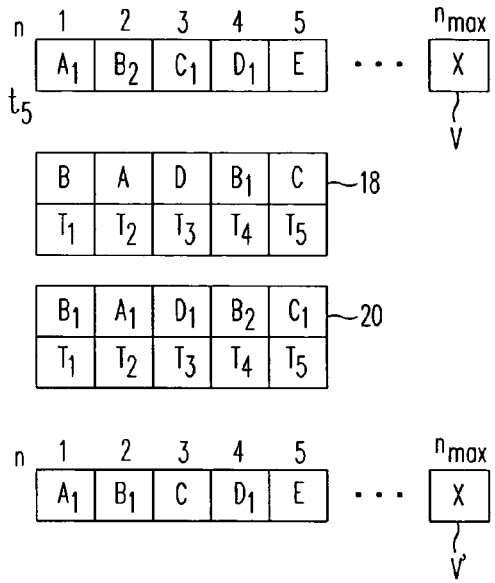

It is noted that data within volume V may be accessed via a read or write data transaction while data of volume V is being copied to backup copy V' in accordance with the backup operation shown in FIG. 4. If volume V is modified via write data transaction before the backup operation completes, the backup copy V' created by the process of FIG. 4 may not be an exact copy of data volume V as it existed at time $t_{start}$. FIGS. 5a-5c illustrate aspects of copying data from volume V to the backup storage system 24 as data within volume V is modified in accordance with write data transactions. After time $t_2$ and time $t_{start}$, server 12 generates a third write transaction to overwrite existing data (designated D) in block 4 of volume V with new data (designated $D_1$). Before existing data D of block 4 is overwritten, data D is copied to roll-back log 18. The existing data D in block 2 of volume V is then overwritten with new data D1 of the third write transaction. The new data D1 is copied to roll-forward log 20 either before or after existing data D is overwritten. Server 12 also generates a tag T3 which it stores along with the new data D1 in roll-forward log 20 and with existing data D in roll-back log 18. T3 includes the identification of the target block (e.g., block 4) of the third write transaction. Additionally, tag T3 includes a time stamp $t_3$ identifying the time when data D is overwritten in volume V with data $D_1$. Either before or after completion of the third write transaction, the data contents of blocks 1 and 2 of volume V are copied to blocks 1 and 2, respectively of backup copy V' in accordance with the process of FIG. 4. FIG. 5a shows the state of volume V, roll-back log 18, and roll-forward log 20 after completion of the third write transaction at time $t_3$ in accordance with the steps shown in FIG. 2. Further, FIG. 5a also shows the state of backup copy V' at time $t_3$.

Server 12 generates a fourth write transaction to overwrite existing data $B_1$ in block 2 of volume V with new data (designated $B_2$). Before existing data $B_1$ of block 2 is overwritten, $B_1$ is copied to roll-back log 18. The existing data $B_1$ in block 2 of volume V is then overwritten with the new data $B_2$ of the fourth write transaction. Data $B_2$ is copied to roll-forward log 20 either before or after existing data $B_1$ is overwritten in volume V. Server 12 generates a tag T4 which it stores along with new data $B_2$ in roll-forward log 20 and with a copy of existing data $B_1$ in roll-back log 18. Tag T4 includes the identification of the target block (e.g., block 2) of the fourth write transaction. Additionally, tag T4 includes a time stamp set to time $t_4$, the time when data B1 is overwritten in volume V. FIG. 5b shows the state of volume V, roll-back log 18, and roll-forward log 20 after completion of the fourth write transaction at time $T_4$ in accordance with the process steps shown in FIG. 2. Moreover, FIG. 5b shows the state of backup copy V' after blocks 1-5 (and possibly more) of volume V have been copied to respective blocks within backup copy V'.

Lastly, in the illustrated example, server 12 generates a fifth write transaction to overwrite existing data (designated C) in block 3 of volume V with new data (designated $C_1$). Before existing data C of block 3 is overwritten, data C is copied to roll-backlog 18. Once data C has been copied to roll-back log 18, data within block 3 of volume V is overwritten with new data $C_1$. Server 12 generates a tag T5 which is stored along with new data C1 in roll-forward log 20 and with a copy of existing data C stored in roll-back log 18. T5 includes the identification of the target block (e.g., block 3) of the fifth write transaction. Additionally, T5 includes a time stamp set to time $t_5$, the time when data C is overwritten in volume V. FIG. 5c shows the contents of volume V, log 18, and log 20 after time $t_5$. Moreover, FIG. 5c shows that data has been copied from all of the data blocks in volume V to backup copy V' in accordance with the process shown within FIG. 4. For the purposes of explanation, it will be presumed that the process shown in FIG. 4 ended at time $t_{end}$, it being understood that time $t_{end}$ may have occurred after time $t_5$.

Figure 6:
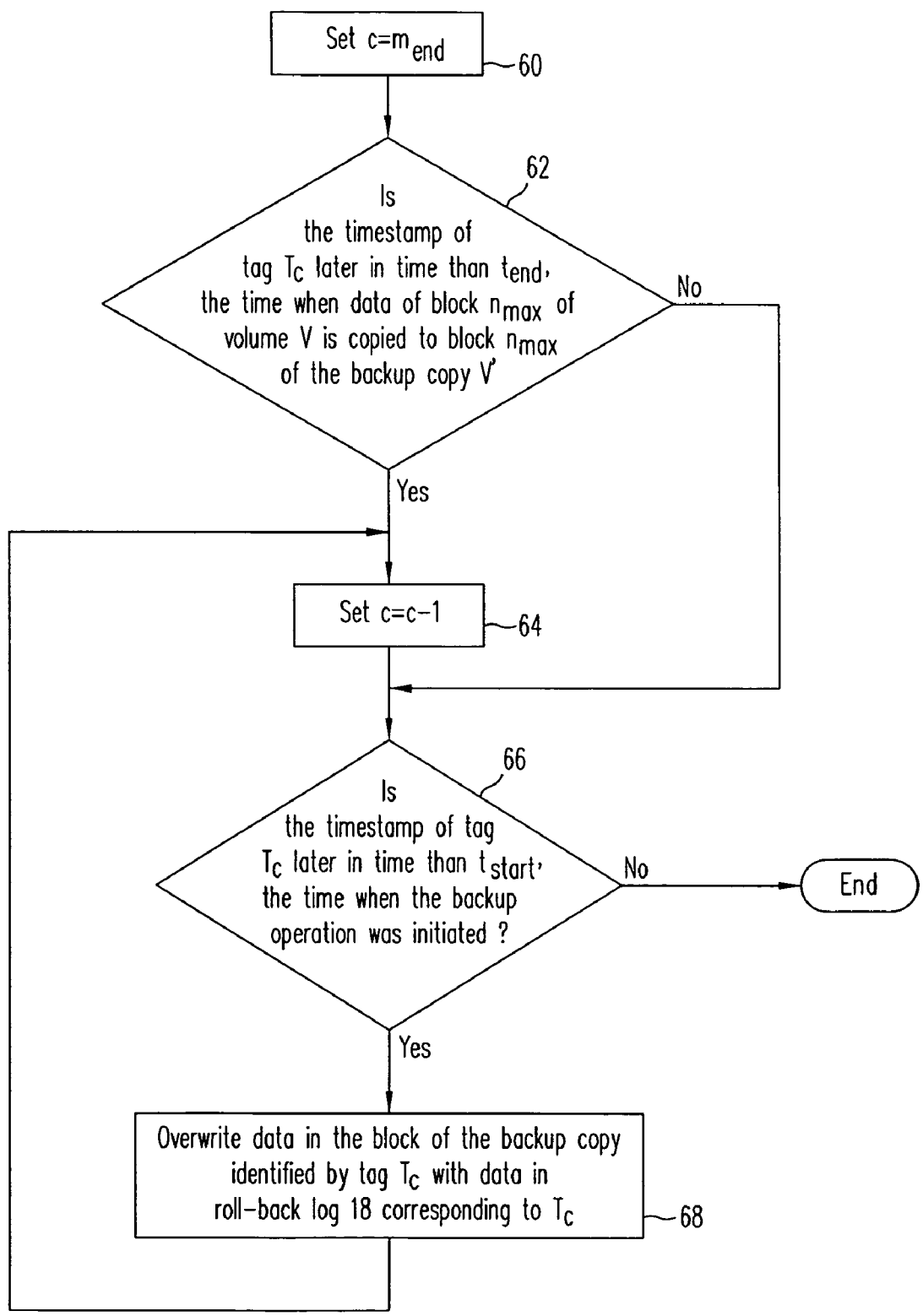
FIG. 6 illustrates relevant aspects of incrementally restoring the backup copy V' in reverse chronological order.

Because volume V was modified during the course of the backup operation described with reference to FIG. 4, backup copy V' does not represent an exact copy of volume V at time $t_{start}$. For instance, data in block 4 of volume V is equal to D at time $t_{start}$. However, data D in block 4 was modified before the contents of block 4 was copied to backup copy V'. As such, block 4 within backup copy V' contains data $D_1$. Roll-back log 18 can be used to incrementally restore backup copy V' in reverse chronological order to equal the data state of volume V at the time $t_{start}$. FIG. 6 illustrates operational aspects of applying the contents of roll-back log 18 to backup copy V' to incrementally restore backup copy V'. For ease of explanation, the process in FIG. 6 is implemented by server 12 executing instructions stored within memory (not shown). The process in FIG. 6 begins when a dummy variable c is set to $m_{end}$, where $m_{end}$ is the tag number of the last tag generated before $t_{end}$ (the time when the backup process shown in FIG. 4 ended). After step 60, server 12 compares the time stamp in tag Tc with time $t_{end}$, the time when the backup process shown within FIG. 4 ended. If the time stamp is later in time, server 12 decrements c by 1 and proceeds to step 66 wherein the time stamp of tag Tc is compared with time $t_{start}$, the time when the backup process shown within FIG. 4 was started. If the time stamp of tag Tc is later in time than $t_{start}$, data in backup copy V' is overwritten with data corresponding to tag Tc and stored in the roll-back log 18. In step 66, the data overwritten in backup copy V' is identified by the block number in tag Tc. If the time stamp in tag Tc is later in time when compared to time $t_{end}$ in step 62, the process bypasses step 64 and proceeds immediately to step 66. Steps 68 and 64 are repeated in order until the time stamp in tag Tc is earlier in time than $t_{start}$ in step 66. When this condition has been met, the process of FIG. 6 ends and backup copy V' should equal the data state of volume V at time $t_{start}$. In other words, when the time stamp of tag Tc is earlier than $t_{start}$ in step 66, backup copy V' should be a consistent backup copy of volume V as it existed at time $t_{start}$. While contents of log 18 is being applied to backup copy V' during the process of FIG. 6, volume V may be modified or accessed in accordance with read or write transactions generated by the application executing on server 12. For purposes of explanation, it will be presumed that volume V is not modified via a write data transaction after time $t_5$.

Figure 7A:
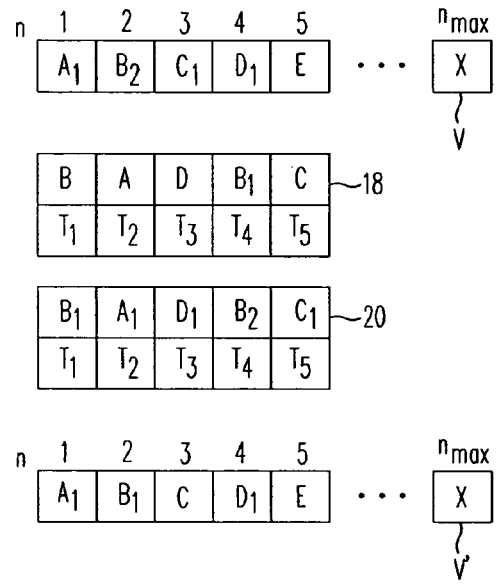
FIGS. 7a-7c illustrates the data state of the backup copy V' after repeatedly performing the process shown in FIG. 6.

The process shown within FIG. 6 can be used to incrementally restore backup copy V' in reverse chronological order from its data state shown within FIG. 5c to the data state of volume V shown within FIG. 3b. To illustrate, server 12 initially sets dummy variable c to 5, which is the value of $m_{end}$ in the illustrated example. Accordingly, server 12 accesses tag T5. Tag T5 has a time stamp equal to time $t_5$, and tag T5 indicates that corresponding data C in log 18 was copied from block 3 of volume V. Since $t_5$ is presumed earlier in time when compared to $t_{end}$, server 12 skips step 64 and compares the time stamp of Tag 5 with $t_{start}$ as shown in step 66. Since $t_5$ is later in time when compared to $t_{start}$, server 12 overwrites existing data in block 3 of backup copy V' with data C from a roll-back log 18. It is noted that in this particular example, the existing data of block 3 of backup copy V' initially contains data C. FIG. 7a shows the result of overwriting block 3 in backup copy V' with data C in accordance with step 68 shown within FIG. 6.

Figure 7B:
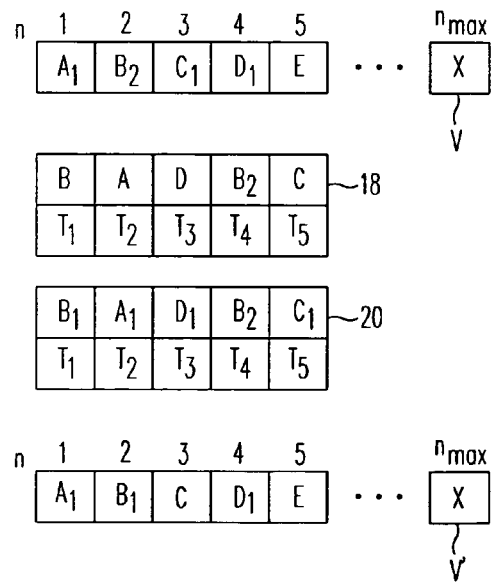

Thereafter, server 12 decrements c in step 64 so that c now equals 4. Server than accesses the time stamp of tag T4, which has a time stamp $t_4$. Tag T4 also indicates that corresponding data $B_1$ in log 18 was copied to log 18 from block 2 of volume V. In step 66, server 12 compares $t_4$, the time stamp of tag T4 with $t_{start}$. Since $t_4$ is later than time $t_{start}$, server 12 overwrites existing data in block 2 of backup copy V' with data $B_1$ from roll-back log 18. Again, in this particular example, the existing data of block 2 of backup copy V' initially contains data $B_1$. FIG. 7b shows the result of overwriting block 2 in backup copy V' with data $B_1$ in accordance with step 68 shown within FIG. 6.

Figure 7C:
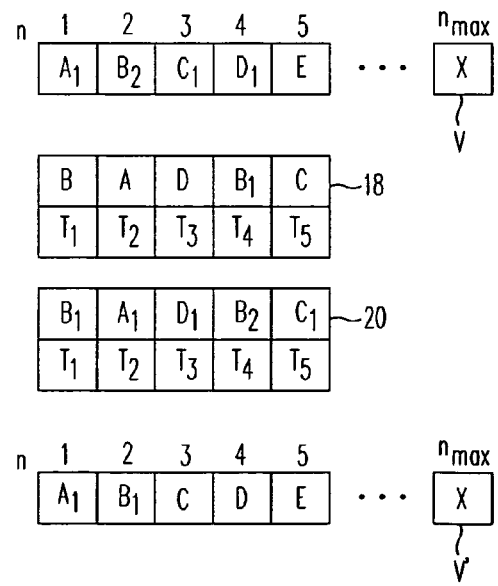

Server 12 then accesses tag T3 after c is decremented to 3 in step 64. Tag T3 has a time stamp equal to $t_3$, and tag T3 indicates that corresponding data D in log 18 was copied to log 18 from block 4 of volume V. In step 66, server 12 compares $t_3$, the time stamp of T3 with $t_{start}$. Since $t_3$ is later than time $t_{start}$, server 12 overwrites existing data in block 4 of backup copy V' with data D from roll-back log 18. FIG. 7c shows the result of overwriting block 4 in backup copy V' with data D in accordance with step 68 shown within FIG. 6. At this point, backup copy V' equals the data state volume V occupied at time $t_{start}$. Nonetheless, server 12 decrements c in step 64 so that c equals 2. Server 12 compares $t_2$, the time stamp of T2 with $t_{start}$. Since $t_2$ is earlier in time than time $t_{start}$, the restore process ends for the illustrated example, and backup copy V' remains equal to the data state of volume V at time $t_{start}$.

Figure 8:
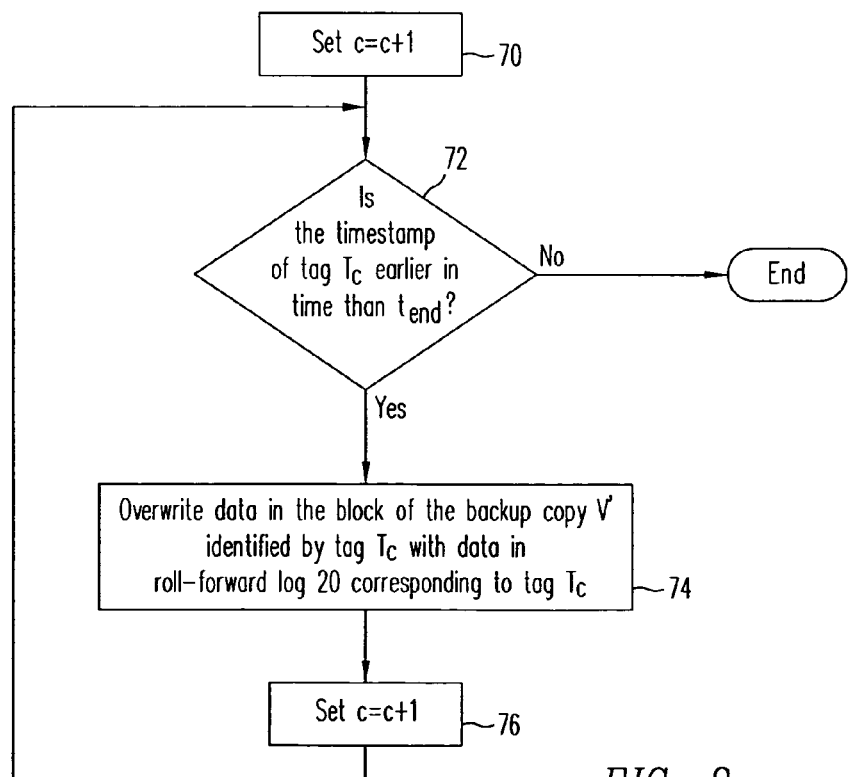
FIG. 8 illustrates relevant aspects of incrementally restoring backup copy V' in forward chronological order.

After backup copy V' has been restored in accordance with the process shown in FIG. 6, backup copy V' optionally can be restored in forward chronological order to equal the data state of volume V at a point in time later than $t_{start}$. FIG. 8 illustrates operational aspects performed by server 12 for restoring backup copy V' in forward chronological order. The process in FIG. 8 starts after a target time is selected. For purposes of explanation, it will be presumed that the target time will be set to $t_{end}$, the time at which the backup process shown in FIG. 4 ended. The process shown in FIG. 8 should be implemented after completion of the process shown in FIG. 6 so that the value of dummy variable c begins with the same value it had when the process of FIG. 6 ended.

The process in FIG. 8 begins with step 70 where server 12 increments c by 1. In step 72, the time stamp of tag Tc is compared with the target time (i.e., $t_{end}$). If the time stamp of Tc is earlier in time than $t_{end}$, the process proceeds to step 74 where server 12 overwrites existing data in backup copy V' with data corresponding to tag Tc and stored in roll-forward log 20. Thereafter, server 12 increments c by 1 in step 76 and repeats step 72. Eventually, the time stamp of tag Tc will be later than the target time $t_{end}$ in step 72, and the process will end. Once the process in FIG. 8 ends, backup copy V' should have been restored to a data state equal the state of volume V at time $t_{end}$.

FIGS. 9a-9c illustrates the effects of applying the roll-forward log to the backup copy V'. To illustrate, server 12 initially increments c by 1 so that c is set to 3, remembering that c was set to 2 when the process ended in FIG. 6. With c set to 3, server 12 accesses tag T3, and in accordance with step 72 shown in FIG. 8, server 12 compares the time stamp $t_3$ of tag T3 with $t_{end}$. Given that the time stamp $t_3$ is earlier in time than $t_{end}$, the process proceeds to step 74 where server overwrites data D in block 4 of backup copy V' with data $D_1$ of roll-forward log 20. It is noted that tag T3 indicates that existing data within block 4 of volume V was overwritten with data $D_1$ in roll-forward log 20 at time $t_3$. FIG. 9a illustrates the data state of backup copy V' after data D is overwritten with data $D_1$ in step 74. C is incremented in step 76.

With c set to 4, server 12 accesses tag T4, and in accordance with step 72 shown in FIG. 8, server 12 compares the time stamp $t_4$ of tag T4 with $t_{end}$. Given that the time stamp $t_4$ is earlier in time than $t_{end}$, the process proceeds to step 74 where server overwrites data B1 in block 2 of backup copy V' with data $B_2$ of roll-forward log 20. It is noted that tag T4 indicates that existing data within block 2 of volume V was overwritten with data $B_2$ in roll-forward log 20 at time $t_4$. FIG. 9b illustrates the data state of backup copy V' after data $B_1$ is overwritten with data $B_2$ in step 74. C is incremented in step 76.

With c set to 5, server 12 accesses tag T5, and in accordance with step 72 shown in FIG. 8, server 12 compares the time stamp $t_5$ of tag T5 with $t_{end}$. Given that the time stamp $t_5$ is earlier in time than $t_{end}$, the process proceeds to step 74 where server overwrites data C in block 3 of backup copy V' with data $C_1$ of roll-forward log 20. It is noted that tag T5 indicates that existing data within block 3 of volume V was overwritten with data $C_1$ in roll-forward log 20 at time $t_5$. FIG. 9c illustrates the data state of backup copy V' after data C is overwritten with data $C_1$ in step 74. C is incremented in step 76. With c set to 6, server 12 accesses tag T6 (not shown), and in accordance with step 72 shown in FIG. 8, server 12 compares the time stamp of tag T6 with $t_{end}$. It will be presumed that the time stamp of tag T6 is later in time than $t_{end}$. As such, the process of FIG. 8 ends, and backup copy V' should have a data state equal to the data state of volume V at time $t_{end}$.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   initiating a process to copy a plurality of data blocks to a backup memory, wherein
      before a last data block of the plurality of data blocks is copied to the backup memory in accordance with the process,
         generating first and second transactions to overwrite existing first and second data, respectively, of first data and second data blocks, respectively, of the plurality of data blocks,
         before overwriting the existing first data, copying the existing first data to a first memory,
         before overwriting the existing second data, copying the existing second data to the first memory, wherein
            the existing first data is copied to the first memory before the existing second data is copied to the first memory,
         overwriting the existing first data of the first data block with new first data,
         overwriting the existing second data of the second data block with new second data, wherein
            the existing first data is overwritten before the existing second data is overwritten,
         copying the new first data to a second memory,
         copying the new second data to the second memory, wherein
            the new second data is copied before or after the new first data is copied to the second memory, and
         copying the first and second data blocks to the backup memory, wherein
            the first and second data blocks comprise the new first and new second data, respectively, when they are copied to the backup memory; and
      overwriting the new first and the new second data stored in the backup memory with copies of the existing first and second data, respectively, from the first memory after the last data block is copied to the backup memory in accordance with the process, wherein the new second data copied to the backup memory is overwritten with the copy of the existing second data from the first memory before the new first data copied to the backup memory is overwritten with the copy of the existing first data from the first memory.

2. The method of claim 1 further comprising:

generating a third transaction to overwrite existing third data in a third block of the plurality of data blocks with new third data;

after overwriting the existing third data with new third data and before the last data block is copied to the backup memory in accordance with the process, copying the new third data to the first memory.

3. The method of claim 2 comprising overwriting data in the backup memory with a copy of the existing third data from the first memory after the last data block is copied to the backup memory in accordance with the process.

4. The method of claim 1 further comprising:

generating first and second meta data corresponding to the copies of the first and second existing data, respectively, stored in the first memory;

wherein the first meta data comprises an identification of the first data block and a first time stamp;

wherein the second meta data comprises an identification of the second data block and a second time stamp.

5. The method of claim 4 wherein the first meta data comprises an identification of a first data volume, the second meta data comprises an identification of a second data volume, the first data volume is different from the second data volume, the first data volume includes the first data block, and the second data volume includes the second data block.

6. A memory that stores instructions executable by a computer system, wherein the computer system implements a method in response to executing the instructions, the method comprising:

initiating a process to copy a plurality of data blocks to a backup memory, wherein before a last data block of the plurality of data blocks is copied to the backup memory in accordance with the process, copying existing first data of a first data block of the plurality of data blocks to a first memory in response to a generation of a first request to overwrite the existing first data with new first data, copying existing second data of a second data block of the plurality of data blocks to the first memory in response to a generation of a second request to overwrite the existing second data with new second, wherein the existing first data is copied to the first memory before the existing second data is copied to the first memory, overwriting the existing first data with the new first data, overwriting the existing second data with the new second data, wherein the existing first data is overwritten with the new first data before the existing second data is overwritten with the new second data, and copying the new first data to a second memory, copying the new second data to the second memory, wherein the new second data is copied before or after the new first data is copied to the second memory, and copying the first and second data blocks to the backup memory, wherein the first and second data blocks comprise the new first and second data, respectively, when they are copied to the backup memory;

overwriting the new first and the new second data stored in the backup memory with copies of the existing first and second data, respectively, from the first memory after the last data block is copied to the backup memory in accordance with the process, wherein the new second data in the backup memory is overwritten with the copy of the existing second data from the first memory before the new first data in the backup memory is overwritten with the copy of the existing first data from the first memory.

7. A memory that stores instructions executable by a computer system, wherein the computer system implements a method in response to executing the instructions, the method comprising:

initiating a process to copy a plurality of data blocks to a backup memory, wherein before a last data block of the plurality of data blocks is copied to the backup memory in accordance with the process, copying existing first data of a first data block of the plurality of data blocks to a first memory, copying existing second data of a second data block of the plurality of data blocks to the first memory, wherein the existing first data is copied to the first memory before the existing second data is copied to the first memory, overwriting the existing first data with new first data, overwriting the existing second data with new second data, wherein the existing first data is overwritten before the existing second data is overwritten, and copying the new first and the new second data to a second memory after overwriting the existing first and the existing second data with the new first data and the new second data, respectively, wherein the first new data is copied to the second memory before the second new data is copied to the second memory.

8. The memory of claim 7 wherein the method further comprises:

overwriting data in the backup memory with copies of the existing first and second data from the first memory after the last data block is copied to the backup memory in accordance with the process, wherein data in the backup memory is overwritten with the copy of the existing second data from the first memory before data in the backup memory is overwritten with the copy of the existing first data from the first memory;

overwriting data in the backup memory with copies of the new first and second data from the second memory after the last data block is copied to the backup memory in accordance with the process, wherein data in the backup memory is overwritten with the copy of the new second data from the second memory before data in the backup memory is overwritten with the copy of the new first data from the second memory.

9. The memory of claim 6 wherein the method further comprises:

generating a third transaction to overwrite existing third data in a third block of the plurality of data blocks;

after overwriting the existing third data with new third data and before the last data block is copied to the backup memory in accordance with the process, copying the new third data to the first memory.

10. The memory of claim 9 wherein the method further comprises overwriting data in the backup memory with a copy of the existing third data from the first memory after the last data block is copied to the backup memory in accordance with the process.

11. The memory of claim 6 wherein the method further comprises:

generating first and second meta data corresponding to the copies of the first and second existing data, respectively, stored in the first memory;

wherein the first meta data comprises an identification of the first data block and a first time stamp;

wherein the second meta data comprises an identification of the second data block and a second time stamp.

12. The memory of claim 11 wherein the first meta data comprises an identification of a first data volume, wherein the second meta data comprises an identification of a second data volume, wherein the first data volume is different from the second data volume, wherein the first data volume includes the first data block, and wherein the second data volume includes the second data block.

13. An apparatus comprising:

a memory system for storing a volume;

a backup memory for storing a backup copy of the volume;

a computer system coupled to both a first memory and a second memory;

an instruction memory for storing instructions executable by the computer system, wherein the computer system implements a method if the computer executes the instructions, wherein the method comprises:

initiating a process to copy all data blocks of the volume to the backup memory, wherein before a last data block of the volume is copied to the backup memory in accordance with the process, copying existing data of a data block of the volume to the first memory, overwriting the existing data of the data block with new data, after the existing data of the data block is copied to the first memory, copying the new data to the second memory, before or after the overwriting the existing data, and copying the data block to the backup memory, wherein the first block comprises the new data when the data block is copied to the backup memory;

overwriting the new data stored in the backup memory with a copy of the existing data stored in the first memory.

* * * * *